Figure 1:
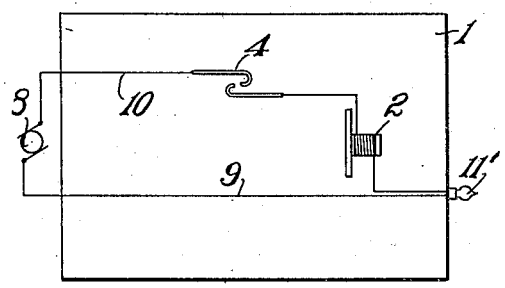

E. H. SCHORER.
ELECTRIC INCUBATOR.
APPLICATION FILED SEPT. 13, 1909.

994,205.

Patented June 6, 1911.

WITNESSES

INVENTOR
EDWIN H. SCHORER
BY
ATTY.

UNITED STATES PATENT OFFICE.

EDWIN H. SCHORER, OF COLUMBIA, MISSOURI.

ELECTRIC INCUBATOR.

994,205. Specification of Letters Patent. Patented June 6, 1911.

Application filed September 13, 1909. Serial No. 517,397.

*To all whom it may concern:*

Be it known that I, EDWIN H. SCHORER, a citizen of the United States, residing at Columbia, Boone county, State of Missouri, have invented certain new and useful Improvements in Electric Incubators, of which the following is a specification.

This invention relates to the automatic regulation of heat and particularly to the regulation of heat developed from an electric current.

In the transmission, regulation and control of a current for the heating of any given space, many problems are involved both in the maintaining of the temperature desired and in the economic operation of the system as a whole.

One of the fields in which the requirements for thermal regulation have been most difficult to meet has been that of incubation. The requirements of this branch are so characteristic and present so fully the general problems that the present application will treat the subject more from the general standpoint of incubation in order that a more complete understanding of the system may be had although it will be understood that the features of my invention apply to almost every form of thermal regulation.

Exact as are the requirements of general incubation it is within the realm of bacteriological incubation that we find the greatest niceties observed, and the greatest exactness sought. Various incubators have been produced and even electrically heated incubators have been tried but for scientific work an accuracy of incubation is required which the incubator usually found in laboratories fails to devleop, especially in the work with certain micro-organisms which grow only within certain narrow limits of temperature variation. In such work it is absolutely essential that the incubator retain a constant temperature throughout the development of the culture.

In my present invention, which as I have before stated is of general application, I have devised a system and means for making allowance for the varying conditions of external temperature as well as for the prompt and exact adjustment and readjustment of the heat development to the internal temperature desired. This allowance for external temperature changes makes it possible to keep an incubator wherever desired rather than necessitating its location in the cellar as is so often the case where the thermostatic adjustment has not been able to accommodate the varying temperatures of a room or laboratory which in the winter months sometimes show differences in twenty-four hours of 30° F. For such a variation as this the ordinary thermostat is not and can not generally be adjusted.

In general my system involves the use of means for varying the amount of electrical energy delivered to the heater in accordance with the general or external temperature and in the graduation of such supply as the limit of variation is approached in either direction. The features of my thermostats and the use therein of an expansile contact breaker, in the form and arrangements of the parts and in the various details, will be more fully set forth in the specification which follows.

Throughout these specifications and in the drawings which form a part thereof I have employed like reference numerals, correspondingly assigned to like parts for their indication. While diagrammatic in form for the most part it is believed that they fully show the invention and will readily enable any one skilled in the art to carry out the invention involved. In these drawings I have shown several forms of my invention as illustrative of its scope application and use.

Figure 2:
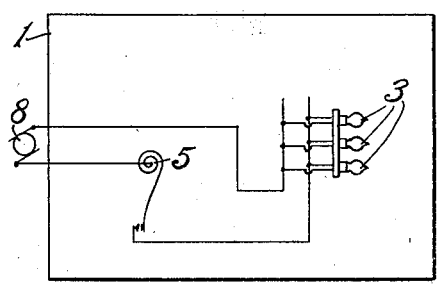
Figure 3:
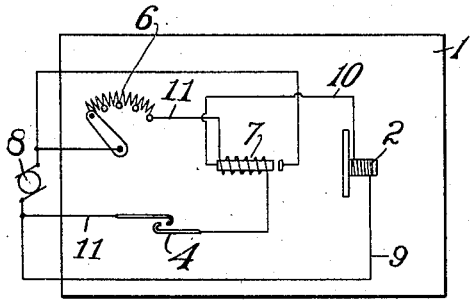
Figure 4:
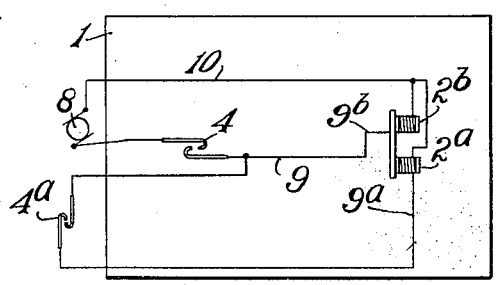
Figure 5:
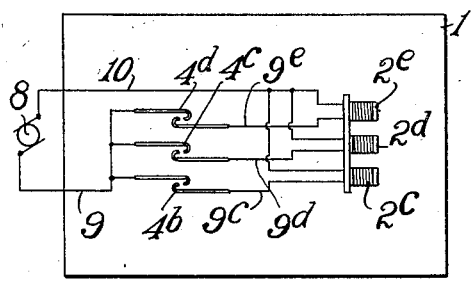

In the various figures shown:—Figure 1 is a diagrammatic showing of an incubator chamber with an internal thermostat and an external pilot, Fig. 2, a similar view of incandescent radiation with plural bulbs and a modified contact breaker, Fig. 3, an arrangement for a system on high voltage, showing resistance and solenoid interruption, Fig. 4 shows a system with an external subcontrol for accommodation to atmospheric variations, and Fig. 5 indicates a system in which a differentiated thermal set follows and regulates in graduation.

In the figures the parts in common are an indicated chamber or space 1 in which is located a radiator indicated either as a heater coil 2 or an incandescent lamp 3 (singly or in parallel).

4 is my expansile thermal contact pair; 5 a thermal contact of spiral form employing differential expansion thermostatically; 6 a rheostat; and 7 an electric magnet contact control.

8 is any source of electrical energy that shown being indicated as a dynamo.

Referring to Fig. 1, it will be seen that the dynamo 8 supplies current through the lines 9 and 10 to a heater coil 2 when, and as long as, the thermostat 4 has its points in contact. During this time the pilot light 11' is illuminated. As soon however as the temperature rises above the predetermined point the oppositely faced hook points of 4 are separated and the contact is broken cutting off the heat generation and the pilot light. The same general arrangement is had in Fig. 2, incandescent lamps 3 in parallel, however, being shown and the spiral thermostat 5 being substituted for my preferred contacts 4.

Fig. 3 is intended to illustrate a form or arrangement where a high current is used. In it the sparking of the contact is avoided by employing an electric magnet 7 to close the circuit 9, 10, said electric magnet being located in a shunt 11 in which is placed a thermostat 4 and a resistance 6.

In Fig. 4 I have illustrated how an incubator may be regulated with regard to that very important factor, i. e., the external temperature. The line 9, in which is located the contact 4, is divided into $9^a$ and $9^b$ and the heater coils $2^a$ and $2^b$ are wound one into each. The branch $9^a$ is carried outside the incubator and at some external point the contact $4^a$ is located. The contacts 4 and $4^a$ are thermally differentiated, for example $4^a$ being operable at say 65° F. while 4 would be set for say 100° F. Thus during the day when heat is on in the laboratory the contact $4^a$ would remain open but when the temperature of the laboratory fell below 65° F. the contact would close and the radiator $2^a$ would be cut in, thus affording an increased surface to keep up the temperature of the incubator in spite of the cooler external surroundings.

In Fig. 5 I have shown a thermal series which I have indicated $4^b$, $4^c$, $4^d$, set for say 70°, 65° and 60° F. respectively. These are also respectively in branches $9^c$, $9^d$ and $9^e$, in each of which a heater coil is wound and all connected to the return wire 10.

The operation of this system would be as follows: As the temperature rose to 60° contact $4^d$ would be expanded to cut out the radiator $2^e$. At 65° the heater coils $2^d$ would be cut out, thus reducing the radiation gradually till at 70° the heater coil $2^c$ would be cut out and in as long as conditions remained nearly constant.

It will be readily seen that the two forms last described are readily capable of use together if it be desired to secure a graduated generation externally, internally or both.

The points of the hook tips are platinum and the members of suitable conductive expansile metal. The various forms shown are capable of a great variety of combinations to meet different requirements and it is to be understood that the use of one or more than one of the features shown in any figure in substitution for a part of another figure or in addition thereto is contemplated.

Various modifications may of course be made within the limits of the appended claims in the various arrangements and constructions of the parts all without departing from the spirit of my invention.

Various metals may of course be used for the members of the thermal circuit closure, it only being necessary that the metal be a proper electric conductor and have suitable expansile properties. It is to be noted that the conductor is operative in contracted position in which it is at its best conductive condition and, therefore at its greatest efficiency and less likely to heat and expand on account of its own resistance. This makes the device more delicate as a thermostat and more efficient as a conductor.

What I therefore claim and desire to secure by Letters Patent is:—

1. An incubator comprising a chamber casing, a plurality of electric radiators influentially associated therewith, an electric circuit for each radiator and a pair of thermally separable contacts in each of said circuits, said pairs of contacts being thermally differentiated from each other.

2. An incubator comprising a chamber casing, means for heating said casing, thermal means within said chamber for absolutely governing the temperature of said chamber and thermal means located externally of said chamber for partially governing said heating means, said means being thermally differentiated.

3. An incubator comprising a chamber casing, an electric radiator influentially associated with said chamber, a pair of thermally separable contacts within said chamber and in the circuit of said radiator and a pair of thermally separable contacts mounted externally of said chamber and also in circuit with said radiator said pairs of contacts being adjusted whereby said circuits will be absolutely governed by said internal thermal means and partially governed by said external thermal means.

In testimony whereof I affix my signature in presence of two witnesses.

EDWIN H. SCHORER.

Witnesses:
ELLIS SPEAR, Jr.,
EDWARD N. GODING.